United States Patent [19]

La Haye et al.

[11] 4,134,449

[45] Jan. 16, 1979

[54] BELLOWS SEALING ARRANGEMENT

[75] Inventors: Paul G. La Haye; John W. Bjerklie, both of Cape Elizabeth, Me.

[73] Assignee: Hague International, South Portland, Me.

[21] Appl. No.: 746,703

[22] Filed: Dec. 2, 1976

[51] Int. Cl.$^2$ .............................................. F28F 7/00
[52] U.S. Cl. .................................. 165/83; 126/91 A; 165/177; 432/223
[58] Field of Search ................. 202/140; 126/92 AC, 126/91 A; 432/223; 165/145, 158, 177, 9.2, 82

[56] References Cited

U.S. PATENT DOCUMENTS

| 2,111,484 | 3/1938 | Woodson | 126/91 A |
| 2,472,497 | 6/1949 | Stookey | 126/91 A |

FOREIGN PATENT DOCUMENTS

| 1083296 | 6/1954 | France | 165/177 |

Primary Examiner—Charles J. Myhre
Assistant Examiner—Theophil W. Streule, Jr.
Attorney, Agent, or Firm—Wolf, Greenfield & Sacks

[57] ABSTRACT

A bellows arrangement for forming a gas leakage resistant pressure seal between ceramic heat exchange tubes has an elongated metallic bellows defining a central passageway with first and second ends. A metallic tube passes through the bellows and freely moves with respect to the second end of the bellows while defining a gas chamber between the tube and bellows. Axial expansion of the bellows under the influence of the internal pressure when such pressure is higher than the external pressure which may be the atmosphere acts to apply a force at the interface between the bellows assembly and the ceramic heat exchange tube which is proportional to the internal pressure of the heat exchange tube, thereby accommodating movement of the heat exchange tube and providing a pressure seal that is leak resistant.

14 Claims, 4 Drawing Figures

U.S. Patent
Jan. 16, 1979
4,134,449
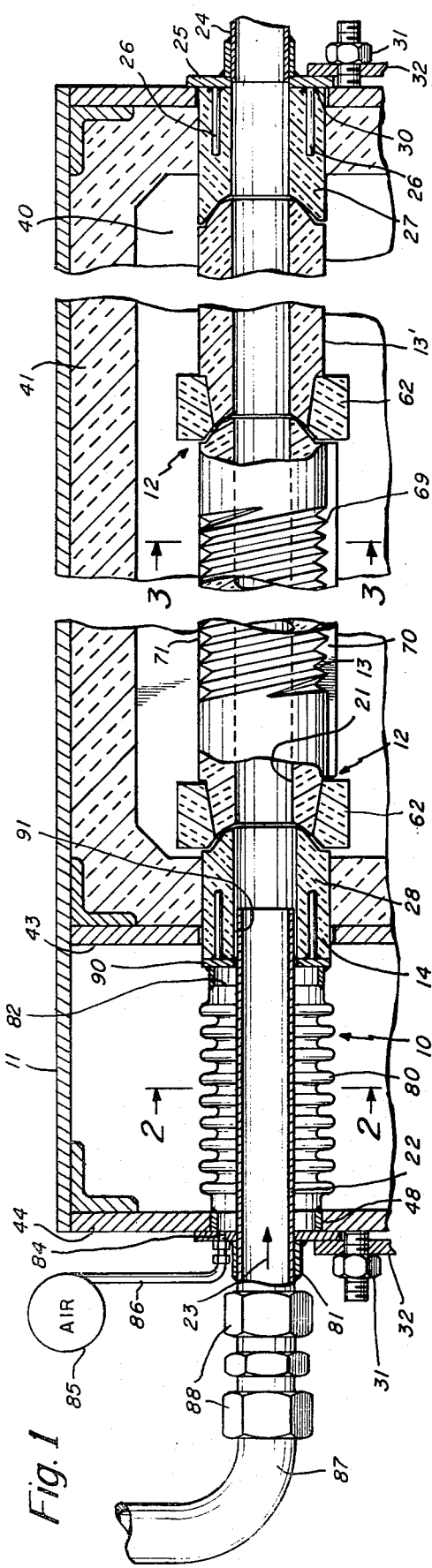
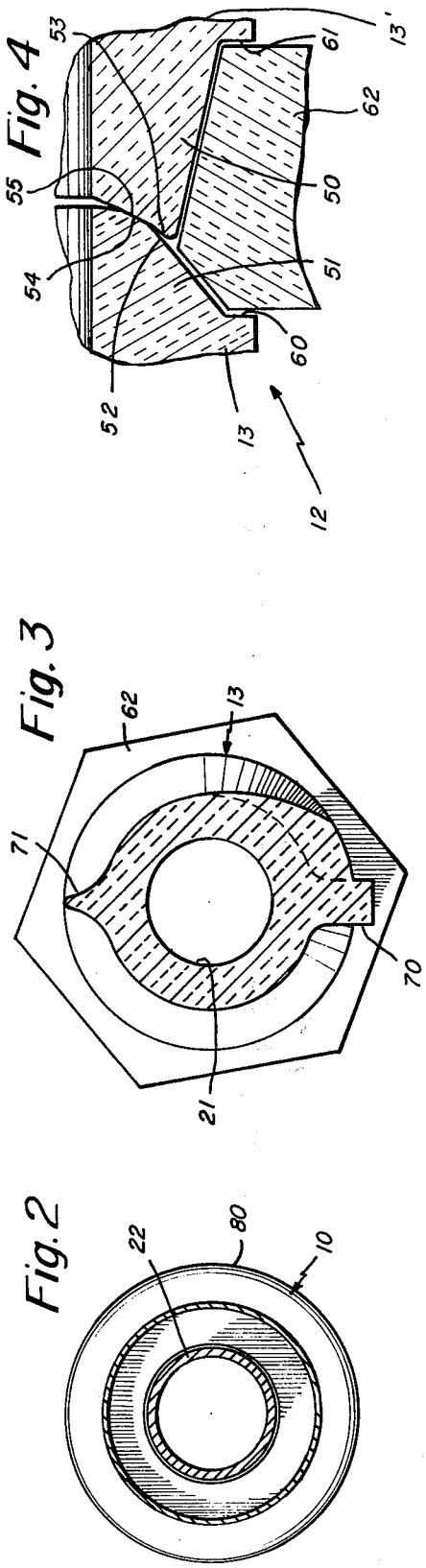
Fig. 1
Fig. 2
Fig. 3
Fig. 4

BELLOWS SEALING ARRANGEMENT

BACKGROUND OF THE INVENTION

Ceramic heat exchange tubes are known for use in heat recuperators, heat exchange units for gas turbine cycles and other heat exchange uses. Such tubes in many uses are subjected to differential gas pressure between the inside system fluid and the outside atmospheric fluid. Joints between tubes and at interconnecting passageways are difficult to make leak tight particularly where extremely high temperatures are encountered in normal operation of the heat exchange elements. For example, when used in connection with forging furnaces, aligned heat exchange tubes in a recuperator could be subject to temperatures of from 1500° to 2400° F. or perhaps even higher. At such temperatures, seals made of conventional materials could disintegrate or distort. In at least one prior application where such ceramic heat exchange tubes are used, springs were used to compress the mating faces of the seals to yieldably urge them into resilient engagement with each other in order to form gas pressure resistant seals. Such spring seals are useful although in some cases it was determined that due to the elevated temperature in the vicinity of the springs, the springs lose their temper in time and must be replaced or reprocessed to maintain the needed force on the seals.

SUMMARY OF THE INVENTION

It is an important object of this invention to provide a bellows arrangement useful for forming gas leakage resistant pressure seals between heat exchange tubes such as at the male-female joint between heat exchange tubes and at the interface between the ceramic components of the heat exchanger and the metallic conduit normally used for the system.

Another object of this invention is to provide such seals which are operative over wide pressure differentials and wide temperature ranges with frequent temperature cycling, yet maintain properties over the life of the ceramic tube assemblies.

Still another object of this invention is to provide a bellows arrangement and method for permitting pressure sealing by bellows elongation due to either heat expansion or internal gas pressure.

It is another object of this invention to provide a male-female ceramic heat exchanger tube joint configuration which can accommodate slight motion between the ceramic elements which may be caused by internal expansion and contraction while maintaining a pressure seal and while minimizing leakage of the internal fluid to the environment.

According to the invention a bellows arrangement for forming a gas leakage resistant pressure seal at an end of an elongated ceramic tube has an elongated metallic bellows defining a central passageway with first and second ends. A metallic tube passes through the bellows and is freely movable with respect to the second end while defining a gas chamber between the tube and bellows. External support means fix the first end of the bellows with respect to a portion of the tube. Preferably a gas pressure means is interconnected with the bellows to actually expand the bellows with respect to the tube to enable the second end of the bellows to exert a positive pressure on a heat exchange tube linked to and aligned with the bellows second end, while permitting the ceramic tube to freely expand and contract under the influence of varying ceramic tube temperatures.

Heat exchange tubes with male-female joints engaging each other are axially aligned with the tube of the bellows so that the expansion of the bellows urges the heat exchange units into contact with each other at the joints. The joints are pressed together under sufficient pressure to form a gas leakage resistant pressure seal.

In the normal operating mode, the bellows is expanded under the influence of the internal system fluid pressure. The force exerted by the expanded bellows on the ceramic tube seals is directly proportional to the cross-sectional area of the bellows and the fluid pressure in the system. Therefore, the higher the system or internal heat exchanger internal fluid pressure the higher the force exerted by the bellows on the pressure seals. When the system is idle or in the non-operating mode, the ceramic tubes will retract and the bellows, in the absence of internal pressure, will contract returning to an equilibrium state under the influence of the elasticity of the material from which the bellows was fabricated. This retraction of the ceramic tubes and the contraction of the bellows would leave a gap at the seals between the elements of the heat exchanger. This gap would be of sufficient size or area as to obviate the buildup of pressure in the system when an effort is made to return to an operating mode. Two methods are available to avoid the separation of the elements in the idle or non-operating mode. These are (1) a separate and distinct fluid pressure source is connected to the annular space between the metallic tube inside the bellows and the bellows proper so that fluid can be pumped into this space causing the bellows to expand to close the gap at the pressure seals until the system fluid pressure rises to a sufficient level to negate the need for an external pressure source; (2) springs may be used in conjunction with the bellows so that in a non-operating mode the springs maintain a small but sufficient force on the pressure seals between the heat exchanger elements so as to permit the system fluid pressure to build up and take over the function of the spring.

The springs mentioned in (2) above would be required only during the transitory period when the operation of the system is initiated from the non-operative mode and would be required to exert only a fraction of the force essential to accomplish a tight seal at normal operating pressures in the ceramic element.

In a preferred male-female ceramic heat exchange tube joint a single thin annular contact joint is used to form a gas leakage resistant seal. Mating conical surfaces taper away from each other at the joint to prevent dirt binding while still allowing initial guiding action of the male into proper alignment with the female joint sections.

It is a feature of this invention that the resilient or spring action of the bellows need not be used to form the pressure seals under normal operating conditions. Thus, spring fatigue and variations in pressure normally encountered in spring elongation do not play an important role in the action of the bellows on the seals. This enables predetermined pressure seals to be formed which are highly resistant to gas leakage and to develop forces on the seals which are directly proportional to the internal pressure of a system.

Preferably the joint seals are designed so that in a normal heat exchanger, the total joint leakage from joints between tubes and between end pieces and tubes is maintained at a value less than one percent by weight of the throughput so that if one pound of fluid is passed through the heat exchanger per hour the leakage through the seals in the heat exchanger would be less than 0.01 lbs/hr at the pressure levels normally encountered in industrial gas turbines, which fall within the range of 60 to 250 psi.

BRIEF DESCRIPTION OF THE DRAWINGS

The above and other objects, features and advantages of the present invention will be better understood from the following specification when read in conjunction with the drawings in which:

FIG. 1 is a side cross sectional view through a bellows arrangement in accordance with a preferred embodiment of this invention mounted in alignment with a plurality of heat exchange tubes in a heat exchanger casing;

FIG. 2 is a cross sectional view thereof taken through line 2—2;

FIG. 3 is a cross sectional view thereof taken through line 3—3; and

FIG. 4 is a cross sectional view through a detail of a joint thereof.

BRIEF DESCRIPTION OF PREFERRED EMBODIMENTS

A preferred bellows arrangement is illustrated generally at 10 mounted in a heat exchange casing 11 and forming gas leakage resistant pressure seals at 12 between two identical axially aligned heat exchange ceramic tubes 13, 13' and between the tubes and ceramic adapter pieces 27 and 28.

The heat exchange tubes 13 and 13' are substantially identical and only one will be fully described. Each tube has an inner passageway 21 aligned with a metal tube 22 of the bellows arrangement and forming a through passageway from left to right to enable a fluid stream indicated at 23 to pass through the arrangement from the left-hand inlet to the right-hand outlet at 24. The outlet tube 24 is welded to a collar 25 having four pins 26 which have cast thereon a ceramic heat insulating end piece 27 which may be cast alumina. The end pieces 27 and 28 are made of heat insulating materials such as alumina to reduce the heat loss from the gases flowing through the heat exchanger to the bellows and other components of the heat exchanger.

The end piece 27 is fixed with respect to a circular bore 30 in the casing 11 by lock nuts and clamping washer arrangements 31 and 32 only one of which is illustrated at the right-hand end although two such washer arrangements are used to clamp the end piece 27 in fixed position.

The casing 11 can be any conventional casing of metallic or other material and in the preferred embodiment is a carbon steel fabricated box defining an internal hot gas passageway 40 having Fiberfrax or other high temperature insulation lining 41. The chamber 40 is further defined by a casing wall 43 spaced from an end wall 44 provided with bores such as 48 for passage of the bellows arrangement. Locking nuts and washers 31, 32 lock the bellows arrangement in place as described with respect to the right hand end piece 27.

The gas leakage resistant mechanical, pressure seals are formed between the end pieces and the heat exchange tubes at the male-female joints 12. Each joint 12 is preferably of special design so as to maximize gas leakage resistance when pressure is applied. Normally pressure in the range of from 15 to 250 lbs/sq/in absolute is applied to the joints by the bellows arrangement. As best seen in FIGS. 1 and 4, each joint is defined by a female end 50 and a male end 51. The male and female ends each define two substantially mating but outwardly diverging conical surfaces 52, 53 which are designed to have an axial length such that they guide the sealing surfaces into mating engagement to properly seat the sealing surfaces and give a centering action for the seat. The sealing surface 54 and 55 of each piece is in the form of mating equal diameter annular rings having widths, (i.e., going from inside to outside of the wall of the tube), of less than half an inch and preferably 1/10 of an inch. This provides only a small surface for sealing and enables good mating action. The wider the sealing surface, the more chance for irregularities to prevent the parts from sealing. The rings 54 and 55 can be slightly convex and concave in cross section although other shapes can be used and they can be flat.

The force on the seal rings 54 and 55 is applied by the expansion of bellows 80 due to the gas pressure acting within it. This force can be expressed as follows:

$$F = A_E(Pi - Pa) + S$$

where
 S = spring effect of bellows which can be ignored in most cases;
 Pi = internal gas pressure;
 Pa = external pressure which can be atmospheric;
 $A_E$ = effective area which is proportional to the largest internal diameter squared of the bellows minus the external diameter squared of tube 22 times $\pi/4$.

Since the leakage through the mechanical seals between the heat exchange elements is proportional to $(Pi-Pa)^X$ where X equal ½ to 2 then as the internal pressure increases F increases which forms a more leak resistant seal since greater force is exerted on all of the sealing surfaces. Since only the ends of each unit at 25 and 84 are fixed, expansion of the bellows applies force at all seals in the axially aligned joints between the heat exchange tubes and end pieces.

The angles of surfaces 52 and 53 are preferably arranged so as to be divergent in order to prevent dirt binding in the joints. Preferably the seal surfaces 54 and 55 have a slope from a line perpendicular to the axis of the tubes of from about 0.1° to 15° which aids in stressing the male end in compression with only slight tension on the female surface.

The joint is designed to have shoulders 60 and 61 arranged to enable locking of a ceramic locking collar 62 to mechanically join and support the joints. The collar 62 can be part of a tube sheet or can be joined to a tube sheet in any manner known in the art. In some cases, tube sheets need not be used when the overall run of the element from left to right is small. In most cases, conventional tube sheets not shown will be used as at the locking collars 62. In typical applications, several parallel sets of tubes are provided with tube sheets supporting ten or more sets at the collars 62 of each.

The ceramic heat exchange units are preferably finned units of the type disclosed in copending U.S. patent application Ser. No. 547,381 filed Feb. 6, 1975 although any elongated ceramic heat exchange tubes can be used in connection with the present invention. Such heat exchange tubes are preferably formed of silicon carbide or silicon nitride having a thermal expansion of from $2.4 \times 10^{-6}$ in/in/° F. over a range of from 75° F. to 2200° F. When the heat exchange units of FIG. 1 have lengths of 40 inches each and the overall length from left to righthand end is 80 inches, expansion and contraction occurring over the temperature range of from 75° to 2200° F. in the elements would be 0.408 inches approximately, less the expansion and contraction occurring simultaneously in the structure 11.

The heat exchange tubes of cast silicon carbide or silicon nitride preferably have working strengths of about 3500 psi in tension, i.e., modulus of rupture, or higher with thermal conductivity of at least 3 BTU/hr/ft$^2$/°F./ft. These tubes are preferably in lengths of at least 30 inches with internal diameters of from $\frac{1}{2}$ inch to 3 inches and preferably 1 inch to 1$\frac{1}{2}$ inches. Fins 69 used preferably have heights of from $\frac{3}{4}$ to $\frac{1}{4}$ inch with tube wall thicknesses of $\frac{1}{4}$ inch to $\frac{3}{8}$ inch. Preferably 1$\frac{1}{4}$ to 3 fins per inch are used. The fins preferably having sloping sided trapezoidal cross sections with variations of from 0.075 to 0.15 inch thickness at fin tip to 0.25 to 0.6 inch root thickness. The root thickness to height ratio of the fins is preferably 0.4 to 0.55. The fins are preferably helically or double helically arranged on the outside of the tube. The tubes have upper and lower fin interconnections which give, as shown in FIG. 1 at 70 and 71, an aerodynamic design to the tubes and aid in mechanical strength of the tubes. Other heat exchange tubes can be used in connection with the bellows arrangement of this invention.

The bellows arrangement 10 is formed by a metallic bellows 80 which may be formed of high heat resistant material and is preferably formed of material such as 300 and 400 series stainless steels and nickel base alloys. The bellows preferably has properties such that it is mechanically resistant to temperatures of from ambient to 2000° F. or higher normally encountered in the heat exchanger fluid. In the preferred embodiment bellows 80 is formed of stainless steel and has a length of about 8 inches, a spring constant of from 5 to 10 lbs/in, convolution height of $\frac{1}{2}$ inch, outside diameter of 4 inches and an inside diameter of 3 inches. Tube 22 is preferably of stainless steel to provide a strong mechanical support and has a wall thickness of about 0.035 inch with an outside diameter of 1$\frac{1}{4}$ inches. Normally the bellows used have lengths of from 6 to 12 inches, spring constants of from 5 to 100 pounds and outside diameters of from 2 to 6 inches. These dimensions may vary greatly depending upon the particular application and temperatures to be encountered.

The lefthand end of the bellows 80 shown in FIG. 1 is welded to a metallic ring collar 81 to form a hermetic joint with the collar and an internally welded tube 22 which passes coaxially through the bellows to define an internal gas chamber 82. The collar 81 has through it the line 86 at hole 84 as will be described. A conventional inlet tube 87 is interconnected through conventional couplings 88 to internal tube 22. The second end of the bellows is welded to a metallic ring 90 having equally spaced mounting pins 14 about which is cast the ceramic end piece 28 so as to form a seal with the second bellows end and ring 90. Ring 90 has a through bore 91 through which passes tube 22 in sliding relationship therewith. A small annular space about tube 22 provides a severely restricted leakage path for system fluid 23.

The bellows 80 can be of conventional fluted design as shown and may be of the laminated construction such as manufactured by American BOA of New York, New York, or of the single wall construction such as manufactured by Tempflex of California.

In operation of the bellows arrangement to form gas leakage resistant pressure seals, the bellows expands to exert force on the end piece 28 which is slidably mounted within the insulation and tube sheet 43 to press the heat exchange tubes together with each other and with the end pieces at the male-female joints and thus form the gas leakage resistant pressure seals at surfaces 54, 55. This pressure is obtained in different ways in use of the bellows.

When the bellows is initially installed, prior to heating to temperature of the recuperator, it preferably is tightly positioned and does apply some slight spring pressure to the male-female joints. However, on heating and relaxation of the bellows after first use, all spring properties of the bellows in its position are substantially lost. At this point, when the bellows is heated under normal operating conditions its axial expansion due to high temperature can be used to provide the sealing pressure to the male-female joints. However, often the bellows is not expanded in use by heat expansion since it may not be exposed to high temperature. When the bellows is not expanded, a problem can occur if pressurized gas is to be passed at 23 through the tubes. Since the bellows is relaxed the joints will be slightly apart with the gas seals substantially open when the inside is pressurized. In order to avoid gas leakage during startup, the air pump 85 is used when the bellows is cold. Air under pressure of from 1.0 to 150 psig is passed into the bellows before or simultaneously with passage of gas at 23 under pressure. The gas pressure within the bellows gas chamber 82 acts to axially expand the bellows since it pushes against ring 90 and thus forms the gas seal prior to this action being caused by the system fluid 23 flowing through the leakage path 91. Tube 86 preferably has a $\frac{3}{8}$ inch diameter in the preferred embodiment. Since the leakage path 91 between the outer diameter of the tube 22 and the inner diameter of the ring 90 is substantially in the order of 0.008 inch, substantial pressures can be built up within the bellows to expand the bellows with the use of air pressures derived from the air pump 85 delivered by tube 86. When in operation, the system fluid 23 will take over the function of the pressurized air from pump 85 and act to maintain the bellows expanded and thus form the necessary seals at the joints of the aligned elements.

In some cases an internal or external coil spring as suggested at 100 can be mounted coaxial with the bellows and used to apply pressure to the joints by spring action on ring 90. Such an arrangement would avoid the need for a fluid pump such as 85, but would be subject to mechanical stress and failure problems.

In some cases holes can be provided in the tube 22 to the chamber 82 to permit leakage of internal gas pressure to the chamber. These holes can be used to enhance leakage as where the passageway 91 is not as large as desired.

While specific embodiments of the present invention have been shown and described, many variations are possible. While a specific heat exchanger has been shown, it will be obvious that varying numbers of heat exchange tubes can be aligned in a single unit as desired in any particular application and similarly a plurality of parallel units can be used as is customary in heat exchanger applications. Varying tube sheet arrangements can be used. The tubes and end pieces may be metal as well as ceramic. The support arrangements using bolt and washers 31, 32 are preferred to enable ease of removal of the units when desired; however, other mounting means can be used. In some cases gases or liquids rather than air can be used to supply the initial pressure in chamber 82 to form the initial seal prior to the internal gas pressure acting to seal. The bellows arrangement can be at either the gas inlet or outlet end of the heat exchange units. In all cases an enclosing bellows is used in conjunction with a central tube to enable pressure exertion under high temperature conditions to cause tight gas sealing of aligned change elements.

What is claimed is:

1. In a heat exchanger having an axially extending ceramic tube the improvement comprising a bellows arrangement for forming a gas leakage resistant pressure seal at an end of said elongated ceramic heat exchange tube, said arrangement comprising an elongated metallic bellows defining a central passageway having first and second ends, a fluid carrying system tube passing through said bellows and freely movable with respect to said second end of said bellows while defining a fluid chamber between said system tube and bellows, means for fixing in position said first end of said bellows with respect to a portion of said system tube, and means for operatively connecting said second end of said bellows to apply pressure to said end of said heat exchange tube which pressure acts to form said seal.

2. A bellows arrangement in accordance with claim 1 and further comprising means for axially expanding said bellows arrangement with respect to said tube.

3. A bellows arrangement in accordance with claim 1 and further comprising fluid pressure means for raising the fluid pressure within said bellows to axially expand the bellows with respect to the system tube to enable said second end of said bellows to exert a positive force on said ceramic heat exchange tube linked to said bellows second end.

4. A bellows arrangement in accordance with claim 2 and further comprising said bellows second end being sealed to a ceramic end piece which is in turn aligned with said ceramic heat exchange tube.

5. A bellows arrangement in accordance with claim 4 and further comprising a series of aligned heat exchange tubes formed of ceramic material with said end piece being aligned with said ceramic heat exchange tubes and urged there against at a joint by pressure exerted by a fluid passing within said bellows when a system comprising the heat exchange tubes is in operation with fluid flowing through the system tube and heat exchange tubes.

6. A bellows arrangement in accordance with claim 3 and further comprising a fluid leakage path between said fluid chamber of said bellows and a passageway defined by said system tube and aligned heat exchange tubes.

7. A bellows arrangement in accordance with claim 1 and further comprising gas pressure means for elevating pressure in said fluid chamber to expand said bellows.

8. A bellows arrangement in accordance with claim 1 and further comprising said bellows second end being sealed to a ceramic end piece which is in turn joined with a ceramic heat exchange tube at a joint having gas leakage prevention features when said joint is under compression.

9. A heat exchanger having a plurality of aligned ceramic heat exchange tubes mounted in an area for exchanging heat between a passageway defined within said aligned tubes and the outside of said tubes, an elongated bellows substantially axially aligned with said tubes and having a first end fixed to a mounting means, a system tube passing within said bellows and fixed to said bellows at said first end and defining a fluid chamber between said system tube and bellows, said system tube being aligned with said ceramic heat exchange tubes to allow through passage of fluid under pressure, means for permitting equalization of fluid pressure between pressure within said system tube and pressure within said chamber, said bellows arrangement being axially expandable upon pressurization so as to exert pressure on said heat exchange tubes related to the pressure in said chamber and to act to seal joints therebetween.

10. A heat exchanger in accordance with claim 9 and further including gas supply means for pressurizing said bellows chamber independently of pressure within said system tube.

11. A heat exchanger in accordance with claim 9 wherein said seals restrict fluid passage to less than 0.01 lbs/hr for a 1 lbs/hr flow rate of gas through the heat exchange tubes at pressures within the range of 60 to 250 psi.

12. A heat exchanger in accordance with claim 9 wherein said system tube is of a high temperature resistant metal, a least one of said seal joints comprising first and second annular mating rings about a central passageway formed by two adjacent heat exchange tubes, said mating rings having a width of no more than about ¼ inch so that the pressure exerted by said bellows when expanded is concentrated to give a mechanical pressure seal which is highly resistant to fluid leakage.

13. In a heat exchanger having a plurality of aligned elongated ceramic heat exchange tubes, a joint arrangement between one of said elongated ceramic heat exchange tube having a male end and another elongated ceramic heat exchange tube having a female end, said tubes each defining aligned central passageways, said male end having a first conical surface and a flat annular sealing surface having a width of less than half an inch, said female end having a conical surface adapted to lie adjacent to said first conical surface and tapering outwardly therefrom to prevent dirt binding and a second annular sealing surface adapted to mate with said first surface and be pressed thereagainst.

14. A joint arrangement in accordance with claim 13 wherein said sealing surfaces have a slope from a line perpendicular to a long axis of said tubes of from about .1° to 15°.

* * * * *